UNITED STATES PATENT OFFICE.

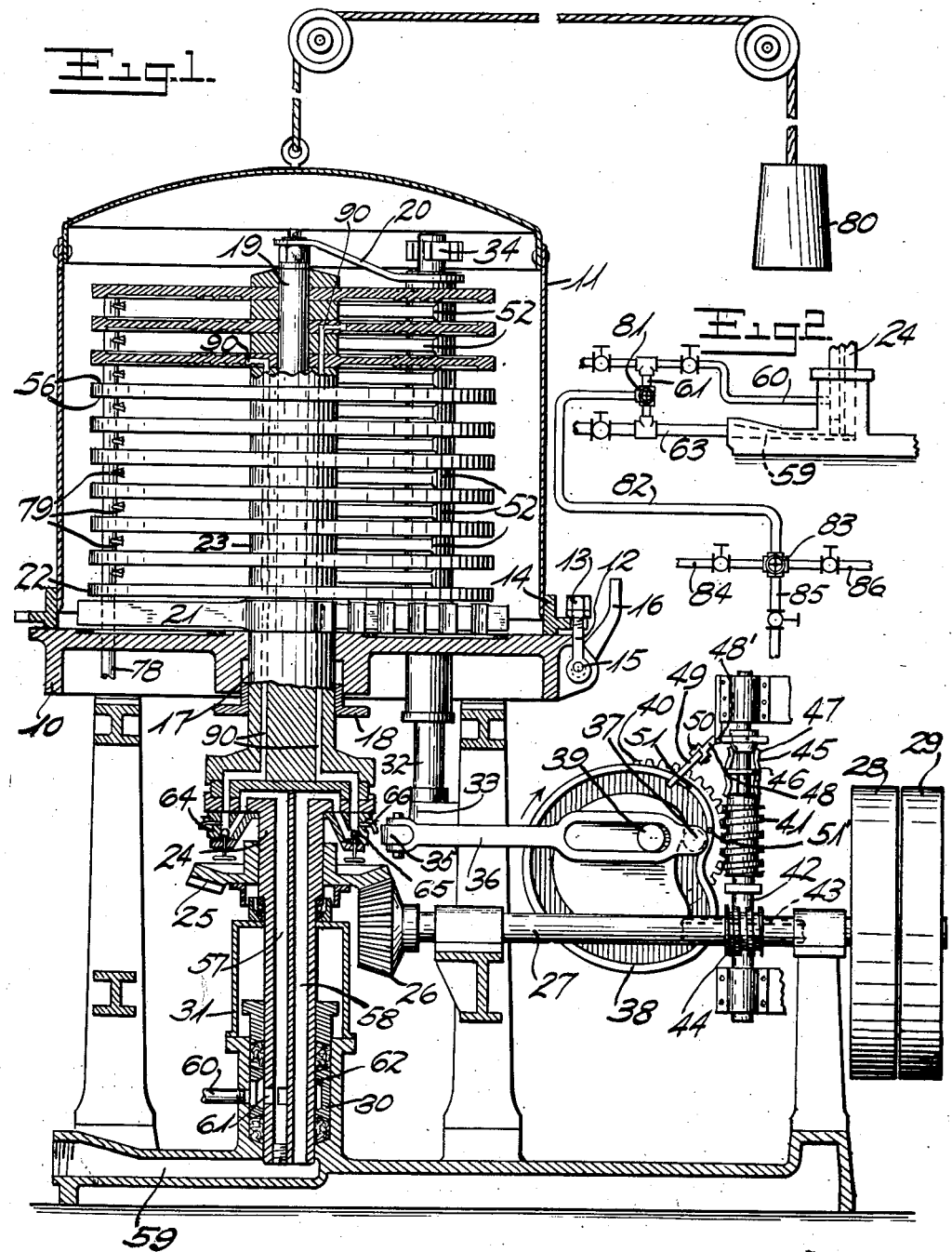

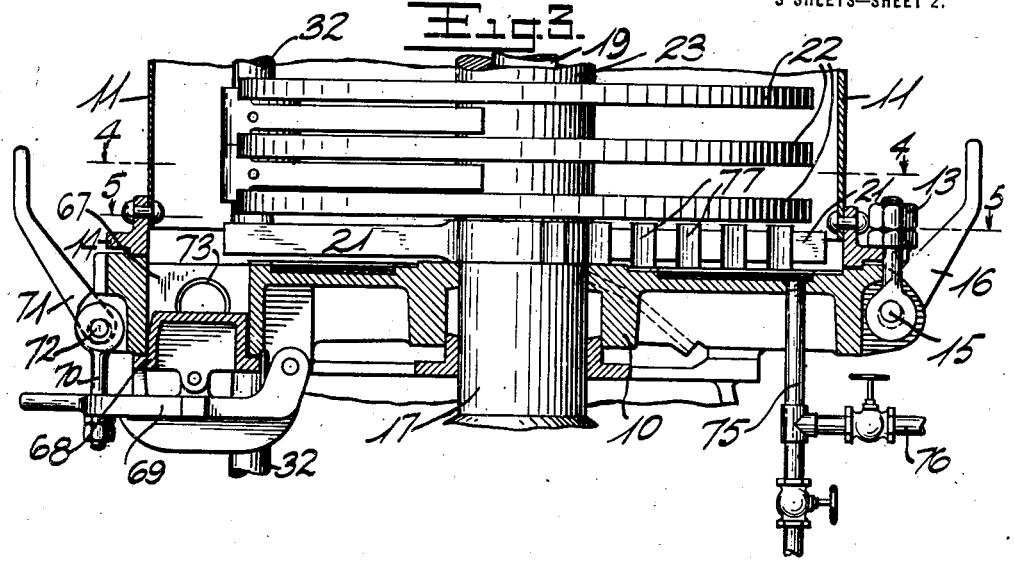
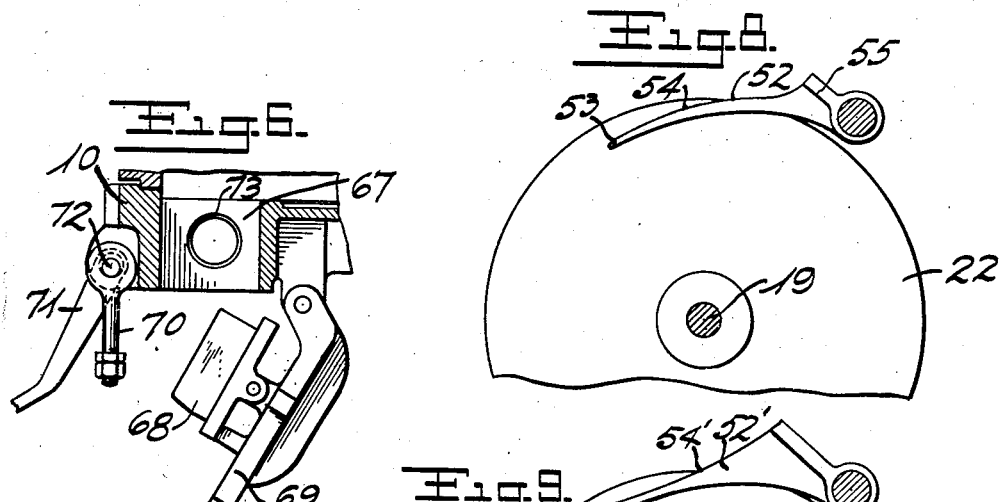
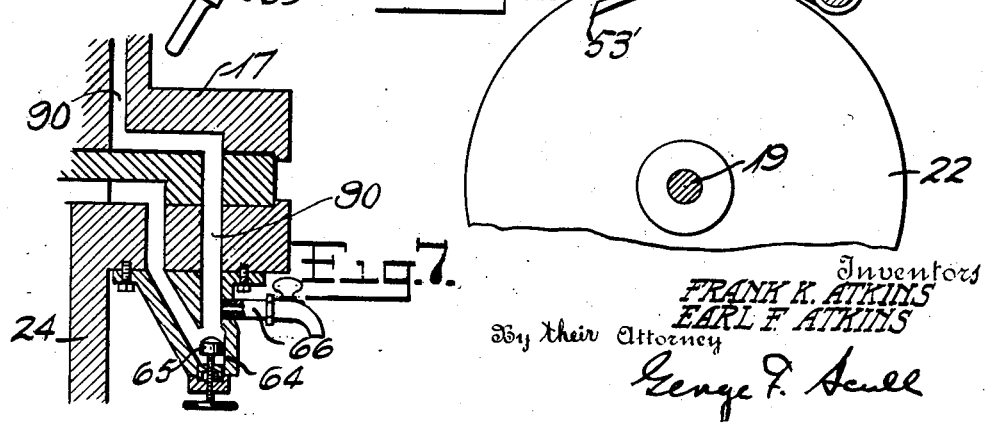

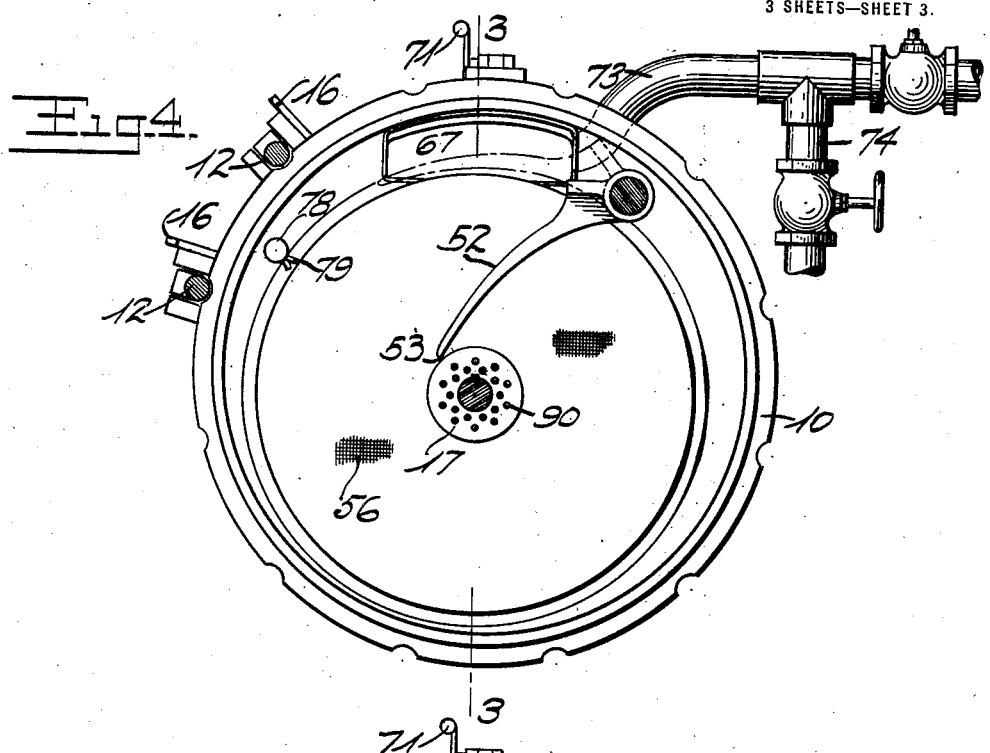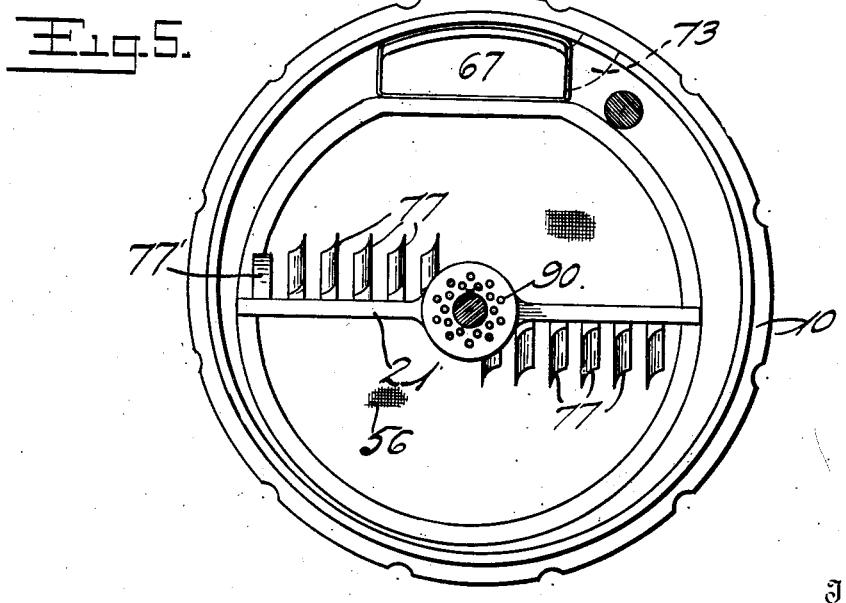

FRANK K. ATKINS AND EARL F. ATKINS, OF NEW YORK, N. Y.

FILTER.

1,350,433.      Specification of Letters Patent.      Patented Aug. 24, 1920.

Application filed September 20, 1916. Serial No. 121,119.

*To all whom it may concern:*

Be it known that we, FRANK K. ATKINS and EARL F. ATKINS, citizens of the United States, and residents of the city of New York, borough of Manhattan, county and State of New York, have invented certain new and useful Improvemennts in Filters, of which the following is a specification.

Our present invention relates to devices for filtering fluids, and particularly, to filters in which the filtering is done under pressure and in which the cakes of the filtered material are built up on the filtering surfaces.

One of the objects of the invention is to provide means by which the cakes may be thoroughly freed from the unfiltered fluid.

Another object of the invention is to provide means by which the filtering surfaces may be thoroughly cleaned between successive filtering charges.

Another object of our invention is to provide means by which the cake may be removed from the filtering surfaces with a minimum expenditure of labor and time.

Another object of our invention is to provide means, in a filter having a plurality of filtering surfaces, by which without stopping the operation of the device, the action of each of the filtering surfaces may be determined, and in the event any such surface is found faulty, it may be cut out of operation without affecting the operation of the remaining surfaces.

Another object of our invention is to provide apparatus arranged so as to insure the maintenance of the cake on the filter plates, so that it may be washed and dried with minimum waste and maximum efficiency.

With these and other objects in view, our invention consists of certain novel features of construction, combination and arrangement of parts as will be more fully described and pointed out in the appended claims.

In the drawings, Figure 1 represents a sectional elevation of one form of our invention which we have chosen for purposes of illustration;

Fig. 2 represents in more or less diagrammatic manner, certain piping arrangements which we find desirable;

Fig. 3 represents an enlarged section of Fig. 1 taken generally on the line 3—3 of Fig. 4;

Fig. 4 is a sectional plan of Fig. 3 taken on the line 4—4 when the cover or casing has been removed;

Fig. 5 is a section on Fig. 3 taken generally on the line 5—5 with the casing removed;

Fig. 6 is a portion of Fig. 3 with the parts in a different position;

Fig. 7 is an enlarged view of the valve arrangement shown at the center of Fig. 1;

Fig. 8 is a fragmentary view of Fig. 4 with the cutter in a different position;

Fig. 9 is a similar view of Fig. 8 with a modification of the cutter.

The corresponding parts are referred to both in the drawings and in the specification by similar reference characters.

Referring particularly to Fig. 1, 10 is a fixed base or support having suitable arrangements by which an air-tight cover 11 may be fastened thereto. In the form illustrated, this consists of a plurality of bolts 12 each having adjusting nuts 13 on one end. The bolts 12 are arranged to engage slots in a flange 14, this latter being connected to the cover 11, the bolts 12 having at the other end an eye which engages an eccentric shaft 15 mounted in suitable bearings in the support 10 and each controlled by a handle 16.

In the center of the support 10, a vertical shaft 17 is suitably supported, being provided with a stuffing box having the gland 18. Concentric with and connected to the shaft 17 and beginning at a point substantially at the top of the support 10 is a shaft 19 which, at its upper end, is braced by the bar 20 connected at its other end to a shaft to be described hereinafter.

The shaft 19 has mounted on it and fastened to it a cutter head 21, to be described more in detail hereinafter and above that, an alternate series of filter plates or leaves 22 and spacing disks or washers 23. Fastened to the shaft 17 and forming a continuation thereof, is a shaft 24 to which is connected a bevel gear 25 meshing with a bevel gear 26 on the shaft 27. The shaft 27 is provided with suitable tight and loose pulleys 28 and 29 and the lower part of the shaft 24 is mounted in a suitable bearing 30 forming part of the supporting frame of the machine and provided with a suitable stuffing box and gland 31.

The shaft 32 passes through the base 10 and is supported at the lower end in a suitable bearing 33, and at its upper end, between the jaws of a bearing 34 connected to the cover 11. The brace 20 extends from the upper end of the shaft 32 to the upper end of the shaft 19. At the lower end of the shaft 32 is a lever 35 suitably connected to a pitman 36 provided at its opposite end with a cam roller 37 engaging in the cam groove of a cam 38. This cam 38 is mounted on and connected to a shaft 39 to which is also attached a worm gear 40 engaging with a worm 41 loosely mounted on an upright shaft 42. The upright shaft 42 has fastened to it a worm wheel 43 engaging a worm 44 on the shaft 27.

Any suitable means may be provided for connecting the worm 41 with the shaft 42, and for this purpose, we have illustrated a clutch consisting of a pair of fingers 45 pivoted on a member 46 and having one end in engagement with the rounded end of the worm 41 and the other end engaging with the cone 47, this cone being splined to the shaft 42 in the usual manner and movable vertically thereon by means of a lever 48 pivoted at 48' and operated by a handle 49. This handle 49 is pivotally connected at 50 to the lever 48 so that when the handle 49 is moved in the plane of the section of Fig. 1, the lever 48 will move with it, and when moved at right angles to that plane, the handle 49 will turn on the pivot 50 without affecting the lever 48. Pins 51 and 51' are fastened to the cam 38 so as to move in a path to cause them normally to strike the handle 49. But the pivoted arrangement at 50 permits the handle 49 to be moved out of the plane of pins 51 and 51'.

Fastened to the shaft 32 and lying between each pair of the filter plates 22 is a series of plows or cutters 52, which, in the form illustrated in Figs. 4 and 8, have a cutting point 53, a curved back 54 and a projection 55. The inner side of the illustrated cutter is curved so that the cutting edge 53 will be the first point presented to the peripheries of the cakes formed between the filter plates.

The filter plates 22 may be of any suitable construction, of the usual type, in which a filtering surface, usually of cloth, 56 is laid over or supported by an internal structure, which is usually cellular in character, so that the cloth on the two faces of the plate or leaf, in combination with the supports therefor, constitute a hollow body. Preferably the top and bottom plates are made with their uppermost and lowermost sides respectively solid. In our preferred form, we provide an outlet conduit 90 communicating with the interior of each of these plates and passing down through the spacing washers 23, the hubs of the filter plates 22, and the shaft 17 into a suitable common outlet conduit, it being understood that down to the point where the shaft 24 joins the shaft 17, these outlet conduits are individual for the interior of each plate, whereas from that point, these conduits are joined so that half of them, communicating with alternate filter plates, empty into a conduit 57 formed in the shaft 24, and the remainder, also communicating with alternate filter plates, empty into a conduit 58, also formed in the shaft 24. The conduit 58 communicates directly with the conduit 59 formed in the support for the press, whereas the conduit 57 empties into the pipe 60 through holes 61 formed in the wall of the shaft 24 and emptying into a groove in a member 62 surrounding the shaft 24. As shown in Fig. 2, the pipe 60 communicates with a pipe 61 emptying into a pipe 63 forming a continuation of the conduit 59.

Between each of the conduits 90 from the filter plates and the conduits 57 or 58, into which these individual conduits lead, we provide a valve, illustrated in enlarged sectional view in Fig. 7. This valve may be arranged in any suitable manner, but as a means of illustration, we have shown the casting 64 attached to the lower part of the upper flange of the shaft 24 and having a valve 65 by which the passage between the outlet conduit 90 of the filter plate and the conduit 57 or 58 may be closed, if desired. Above the valve 65 we provide a cock 66 communicating with the individual conduit 90, and which, during the operation of the machine, is normally closed, the valve 65 at the same time being normally open.

In the base 10 is formed a pocket 67 which may be of any suitable size, both in area and in depth. The bottom of this pocket or receptacle is closed by a plug valve 68 operated by a lever 69 and normally locked in place by a bolt 70 controlled by an eccentric shaft 72 having a handle 71. An inlet pipe 73 communicates with the interior of the press through the pocket or receptacle 67. Communicating with this inlet pipe 73 is a pipe 74 to be used for purposes to be fully explained later. Each of these pipes 73, 74 is provided with suitable valves.

Preferably, the upper part of the base 10 is provided with a recess fitted with suitable supports and a filter cloth so that it forms a filter plate. The interior of this filter plate communicates with an outlet pipe 75 to which is attached an auxiliary pipe 76 for a purpose to be hereinafter described.

Preferably, the cutter head 21 is formed as shown best in Fig. 5, having a pair of arms to opposite sides of which are attached a series of plows or cutters 77 arranged so that, as the head 21 rotates, the cutting edge of a plow on one arm will travel over the path of the space between a pair of cutters on the other arm. With this arrangement the whole surface of the filter cloth on the base 10 will be passed over at each rotation of the head 21 by the plows 77.

The outermost cutter 77', as shown at the left of Fig. 5, is not formed like the other cutters 77 to have an approximately plowshare shape, but is formed so as to push the material which it cuts, straight ahead. It will be noted that this cutter 77' travels in a path which carries it over the opening 67 so that any material pushed forward by it will be thrown into that opening.

Passing through the base 10 inside of the cover 11 is a pipe 78 communicating with any suitable fluid supply, and being provided with small outlet pipes 79 between each pair of the filter plates 22.

In order to balance the cover 11, we provide a weight 80 passing over suitable pulleys.

With the machine constructed as described, the unfiltered fluid is passed into the space within the cover and above the base 10 through the pipe 73. The pressure under which this fluid is maintained in the press may be varied, as usual in this type of filter. The fluid passes through the filter cloth on each leaf and down through individual conduits 90 from the interior of each plate into either the outlets 57 or 58, according to with which one of these outlets the individual conduit communicates, and from thence, either through the pipe 59 or the pipe 60 to any suitable receptacle. At this time, usually the valve 81 in the pipe 61 is turned so that the fluid passes from the pipe 61 into the pipe 63, joining the fluid passing from the conduit 59. Preferably, the valve 81 is arranged so that the pipe 82 may be shut off from the pipe 61 or made to communicate with the pipe 63 or the pipe 60, as desired. The pipe 82 is also provided with a three-way valve 83 by which any one of pipes 84, 85 and 86 may be made to communicate with pipe 82.

While the filtering operation is going on, preferably the filter plates are not rotated, and the cutters 52 are withdrawn outside of the periphery of the filter plates, as shown in dotted lines in Fig. 4. The continuation of the filtering operation gradually builds up the cake on the filtering surfaces, as is usual, and preferably in the treatment of those materials adapted thereto, we continue this process until the cake is built up solidly between each pair of plates, because by so doing, we can produce cake having less moisture than if the cakes on the two adjacent plates did not meet. When the top and bottom plates are made with their upper and lower faces respectively so as to prevent any filtration therethrough, as we prefer, there will be no cake deposited on such surfaces and all of the cake will be formed between the plates 22 so that all of the cake may be solid.

After the cake is built up, preferably it is thoroughly washed and dried, before removing, and to this end the mechanism which we have provided furnishes a convenient means. By suitable manipulation of the valves 81 and 83, either steam, hot or cold water or compressed air, or any other suitable fluid, or each of them in succession, may be passed through one of the conduits 57 or 58, and thus through the outlet 90, into the interior of each alternate filter plate. If this fluid is passed through the conduit 57, for instance, it will flow from the interior of each alternate filter plate through the cake, into the opposite filter plate, and from thence through the conduit connecting that filter plate with the conduit 58, from which the cleaning fluid, whether compressed air or steam or water, will pass into the outlet pipe 63. If desired, the direction of flow of the cleaning fluid may then be reversed. Also, if desired, compressed air may be forced through the inlet pipe 73, to expel all liquid from the cake and the press. After the cake has been thoroughly washed and dried by this means, the cutters 52 and the cutter head 21 are brought into play to remove the cake from the press without dismantling the filter plates, as is usually required. To this end the shaft 27 is revolved, thus rotating the vertical shaft carrying the filter plates. At the same time, through the gearing provided, the cutters or plows 52 are swung so that their cutting edges 53 gradually cut into and break up the cake between each pair of filter plates, the cake thus broken being forced by the back of the cutter or plow from between the space between the filter plates, from which it falls into the opening or receptacle 67.

With the machine constructed as shown in the drawings, usually the plug valve 68 will be open at this time so that the dried cake may be dropped out of the machine. It is obvious that by making the receptacle 67 sufficiently large, it will be unnecessary to open the press, even to the small extent necessitated by the area of the plug valve 68, for the receptacle 67 could be made large enough to hold the material formed in a considerable number of operations of the press. This is particularly desirable with some kinds of materials where it is necessary to keep the machine at a relatively high temperature to prevent the material from "freezing" or solidifying when the temperature is lowered, as it would be if the machine were open to the air in order to remove the cake.

At the same time that the cutters or plows 52 are removing the cake from between the filter plates, the cutter head 21, carrying the plows 77, is also rotating over the surface of the filter cloth on the base 10, thereby removing any cake which may have been deposited on that cloth, and the plows 77 are shaped so that this broken cake is gradually moved outwardly until it also is thrown into the opening or receptacle 67. By having a plurality of plows as shown, the cutter head 21 may be readily started even though the cake has been formed around it during the filtering operation.

After the cake has been removed, it is desirable to clean the filter cloths before a second charge of material is turned into the press, and to this end we have arranged the cutter blades 52, as well as the plows 77, so that they may serve for this second function also. It will be noted that, in our preferred form, the cutter blades 52 are not quite so wide as the space between each pair of filter plates 22. This will leave a small quantity of the cake on the filter cloths after the main body of the cake has been removed. Now, with the filter plates 22 rotating and with the cutter blades 52 at rest between each pair of filter plates, with their points 53 in contact with the washers 23, we preferably force compressed air through both conduits 57, 58 by suitable manipulation of the valves 81 and 83. This fluid will, of course, slightly raise the filter cloths from their supporting surfaces and force them with a yielding pressure against the sides of the blades 52, which then act as scrapers by which all of the solid matter held on the cloths is scraped off and removed. In order to clean the cloths thoroughly, we then force steam, water or air and water combined, into the interior of the plates and through the cloths and this forces all of the solids in the cloths to the surface, from which it is removed by the scrapers as the plates rotate. This gives a much more effective cleaning with a minimum amount of cleaning fluid, than is possible by any other method of which we have knowledge, while because of the yielding nature of the pressure which holds the cloths against the scrapers, the cloths are not damaged in the cleaning process. The cleaning fluid thus used may be carried off through the pipes 73 and 74, the valves in these pipes being set so that the pipe 74 becomes a drain. If desired, this cleaning fluid may be removed by opening the plug valve 68.

While this cleaning process of the cloths is going on, or at any other time when it is found suitable, a cleaning fluid may be turned on through the pipe 78 and the small pipe 79 so as to wash the faces of the filter cloths as the filter plates are rotated.

The cloth over the base 10 may be cleaned in a similar manner by turning the cleaning fluid through the pipe 76 into the pipe 75 while the plows 77 are rotated over its surface.

The gearing which we have illustrated in Fig. 1, provides suitable means by which the filter plates may be rotated while the cutter blades 52 are either moving through the spaces between the plates or stationary, as may be desired.

As shown in Fig. 1, the parts are in the position which they would have shortly after the belt is thrown on the tight pulley 28 to cause the filter plates to begin to rotate. To this end the handle 49 has been swung out of the path of the pin 51 and moved upwardly to push the clutch fingers 45 into engagement with the worm 41. This will cause the cam 38 to rotate in the direction of the arrow in Fig. 1 until the pin 51' reaches the handle 49, when the clutch will be thrown out and the further rotation of the cam 38 will be stopped. This will leave the cutters or plows 52 in the position shown in full lines in Fig. 4. After the cleaning process has been completed, the handle 49 may be removed from in front of the pin 51' and the clutch again engaged to rotate the cam 38 until the pin 51 contacts with the handle 49 at which time the cutters or plows 52 will have been moved from between the active faces of the filter plates.

The valves 65 are provided so that while the press is in operation, the filtrate passing from any filter plate may be tested to insure that none of the unfiltered fluid is escaping from the press without being properly filtered. If, while the machine is in operation, the valve 65 is closed and the cock 66 open, samples of the filtrate passing through the particular plate with which that conduit 90 communicates, can be drawn off and tested, and if this fluid shows that, by reason of a break in the filter cloth on that particular plate, or for any other reason, that particular plate is not operating properly, the valve 65 can be kept closed, thus removing its particular plate from operation without disturbing the operation of any of the other plates.

In Fig. 9 we have shown a plow or cutter 52' in which the back 54' is shaped so that the material will be moved from the cutting point 53' on a curve which, for some materials, will be found more desirable than that illustrated in Fig. 8.

While we have shown the cutter blades or plows 52 as our preferred method for breaking up and removing the cake from between the filter plates, it will be understood that the mechanism to this end may be varied within wide limits. For instance, while we prefer to rotate the filter plates while the cutting blade is stationary, the reverse of this arrangement is obviously possible, and while we have shown the cutter blades or plows as moving from the exterior to the interior of the cakes during the cutting operation, it is obvious that the mechanism may be arranged in such a way that the cutting blades or plows are normally inside of the cake and are moved outward during the cutting and removal of the cake. In such an arrangement a chute would be formed at the center of the filter plate supports by which the cake material would be removed from the machine, the washers separating the plates being in the form of rings in contact with the outer edges of the plates. Whatever the specific device, it should be understood that, especially when dry cake is to be produced and removed, we prefer to arrange the cutters or plows so that they are normally removed from between the active faces of the filter plates during the filtering process.

While we prefer the motion of the shaft 32 as a convenient means for feeding the cutting point of the cutter or plow, through the cake, it is obvious that this cutter point may be supported and fed into the cake in any suitable manner, as for instance, on a radial line by any suitable mechanism. The arrangement which we have shown, however, we have found simple in construction and efficient in operation.

While we prefer an arrangement in which the filter plates may be rotated, such rotation is by no means essential to the operation of our device.

While preferably we provide a cock 66 by which the fluid passing from the filter plates may be tested, we do not wish to be limited to that specific arrangement. For instance, practically the same results could be accomplished if a part of the individual conduit, preferably just before reaching the valve 65, were made transparent so that if the fluid passing from any plate were cloudy, the valve 65 for that plate could be closed to cut out that plate from operation.

While for purposes of economy, we construct the cutter blades or plows 52 so that the same will act both as cutters in removing the cake and as scrapers in cleaning the cloth, it will be obvious that these two functions may be performed by separate devices arranged so that each may be separately thrown into operation as desired.

It is also obvious that if desired, a cutter head, like that shown at 21, may be used between each pair of filter plates and this may be done particularly if the cake formed is soft and easily cut. Because of the liability of the cake forming in a solid mass around the cutter head, we prefer, however, to arrange cutters which are normally removed from the active faces of the filter plates until such time as they are brought into action to break up the cake.

Preferably for most materials it is desirable to form the cake on the plates and then remove this cake in the manner which we have just described, but it is obvious that with certain materials, and particularly those in which dry cake is not required or desired, we may operate our novel press so as to obtain substantially continuous filtration. By placing the plows or scrapers 52 in the full line position of Fig. 4, and at the same time rotating the filter plates while the filtering process is going on, it will be obvious that as fast as the residue is formed on the surface of the plates, it will be scraped off and removed from between the filter plates into the opening or receptacle 67.

By arranging the plates vertically, one above another, we obtain certain advantages which would not be obtained if the shaft supporting these plates were horizontal instead of vertical. With the vertical arrangement it will be obvious that the cake as formed, is supported on the plates so that there is no danger of any portion of the cake falling from the space between any pair of filter plates, as is likely to occur if the supporting shaft were horizontally disposed. This falling away of portions of the cake becomes a serious matter when it is desired to wash and dry the cake. The cleaning or drying fluid passed through the filter plates, will seek the portions of the cloth exposed by this falling away of the cake instead of passing through the cake, as is necessary to wash and dry the cake. It will also be obvious that it is impossible to wash or dry any portions which have fallen from the plates before the washing and drying stage is reached. By arranging the filter plates vertically, as we have illustrated, all possibility of not having a uniform cake at the time of washing and drying the cake, is obviated, and this, coupled with our novel means for removing the cake thus formed and supported, constitute an important feature of our invention. We do not wish to be restricted, however, to this vertical arrangement, for it is obvious that for many purposes a horizontal arrangement will give satisfactory results.

While we have illustrated our invention in connection with a filter of the pressure type, it will be understood that our invention is not limited to that type of filter and that many of its features may be used with other types such as suction filters and the like.

We claim:

1. In a filter, a substantially flat filter plate, means for building up a cake on said plate and a cutter constructed and arranged to break up the cake after it is formed, said filter plate and said cutter being relatively movable.

2. In a filter, a pair of filter plates spaced apart, means for building up a cake between said plates, and a cutter, constructed and arranged to break up the cake after it is formed, said plates and said cutter being relatively movable.

3. In a filter, a pair of filter plates spaced apart, means to build up a cake between said plates and a cutter, constructed and arranged to break up the cake after it is formed, said plates and said cutter being relatively movable and said cutter being shaped so as to move the cake from between the plates as it is broken up.

4. In a filter, a rotatably mounted filter plate, a cutter arranged to break up the cake formed on said plate and means to rotate said plate.

5. In a filter, a rotatably mounted filter plate, a cutter arranged to break up the cake formed on said plate, means to rotate said plate and means to feed said cutter through the cake as said plate rotates.

6. In a filter, a pair of rotatably mounted filter plates spaced apart, a cutter constructed and arranged to break up the cake formed between said plates, means to rotate said plates and means to feed said cutter through the cake as said plates rotate.

7. In a filter, a pair of rotatably mounted filter plates spaced apart, a cutter constructed and arranged to break up the cake formed between said plates, means to rotate said plates and means to feed said cutter through the cake as said plates rotate, said cutter being shaped so as to move the cake from between the plates, as it is broken.

8. In a filter, a pressure tank having a receptacle therein, a pair of rotatably mounted filter plates spaced apart in said tank, a cutter normally outside the peripheries of said plates, means to rotate said plates and means to feed said cutter through the cake as said plates rotate, said cutter being shaped to move the cake from between the plates, into said receptacle, as the cake is broken up.

9. In a filter, a pair of filter plates spaced apart and a cutter normally removed from the space between the active faces of said plates, said plates and said cutter being relatively movable to break up the cake formed between said plates, said cutter being adapted to be moved also transversely of the direction of the relative motion between said plates and said cutter.

10. In a filter, a pair of filter plates spaced apart and a cutter normally removed from the space between the active faces of said plates, said plates and said cutter being relatively movable to break up the cake formed between said plates, said cutter being adapted to be moved also transversely of the direction of the relative motion between said plates and said cutter, and said cutter being shaped so as to move the broken cake from between said active faces.

11. In a filter, a pressure tank, a plurality of filter plates, spaced apart, therein, means to build up a cake between said plates and mechanical means to remove the cake from between said plates after it is formed and while said pressure tank is closed.

12. In a filter, a rotatable shaft, a plurality of filter plates mounted thereon and spaced apart, a cutter shaft parallel to said rotatable shaft, a plurality of cutters on said cutter shaft, each opposite a space between a pair of said filter plates and normally removed from said space and means to rotate said rotatable shaft, said cutter shaft being movable to feed the cutters into the spaces between said plates as they are rotated.

13. In a filter, a rotatable shaft, a plurality of filter plates mounted thereon and spaced apart, a cutter shaft parallel to said rotatable shaft, a plurality of cutters on said cutter shaft, each opposite a space between a pair of said filter plates and normally removed from said space, means to rotate said rotatable shaft, said cutter shaft being movable to feed the cutters into the spaces between said plates as they are rotated. and said cutters being shaped so as to move the broken cake from between said plates.

14. In a filter, a filter plate having its active face horizontal, means for forming a cake on said plate, means for forcing a cleansing fluid through said cake after it is formed and while it is on said plate and mechanical means for breaking up and removing the cake from said horizontal face, after it is formed.

15. In a filter, a pair of filter plates spaced apart, with their active faces horizontal, to form a pair of filtering surfaces on opposite sides of such spaces, means for forming cakes on said horizontal faces, means whereby fluids may be passed through the cakes after they are formed and while they are on said horizontal faces, and mechanical means for breaking up and removing cakes from said horizontal faces, after they are formed.

16. In a filter, a pair of filter plates spaced apart with their active faces horizontal, and means whereby fluid may be forced from the interior of one of said plates, through the cake formed therebetween, into the interior of the other plate.

17. In a filter, a filter plate, means for rotating said plate during the filtering process, and a scraper extending across the active face of said plate and adapted to remove during the filtering process the solids collected on said active face.

18. In a filter, a filter plate having a filter cloth on its active surface, means for causing fluid to flow through said cloth from the interior of the plate to the outside thereof, adapted to lift the cloth away from the surface of the plate, a hard edged scraper mounted to be out of contact with the cloth except when the fluid is flowing, the scraper extending across the active face of the plate, the plate and the scraper being relatively movable while the fluid is flowing to scrape the surface of the cloth.

19. In a filter, a pair of filter plates having filter cloth on their active surfaces, an arm having a cutting edge and a width less than the space between said plates and adapted to be moved into said space and across the active faces of said plates, said arm and said plates being relatively movable so as to break up and remove the cake formed therebetween, and means for causing fluid to flow through said cloths from the interior of the plates to the outside thereof to force the surfaces of said cloths into contact with the sides of said arm when it is between said cloths.

20. In a filter, a substantially flat filter plate and a cutter head comprising a plurality of arms each provided with a plurality of cutter blades, each adapted to cut the cake formed on said plate, said cutters being spaced on said arms so that the cutters on one arm will cut the portion of the cake not cut by the cutters on the other arm and means to rotate said plate and said cutter head relatively to each other.

21. In a filter, a substantially flat filter plate and a cutter head having an arm provided with a plurality of cutters thereon and adapted to cut the cake formed on the surface of said plate, and means to rotate said plate and said arm relatively to each other.

22. In a filter, a plurality of filter plates spaced apart, a central support for said plates, having a separate discharge conduit therein for each plate, and means whereby the conduit of each alternate plate may be placed in communication with a source of fluid pressure.

23. In a filter, a plurality of filter plates spaced apart, a central support for said plates, having a separate discharge conduit therein for each leaf and means for closing each of said conduits.

24. In a filter, a plurality of filter plates spaced apart, a central support for said plates having a separate discharge conduit therein for each plate, a common conduit arranged to receive the filtrate from all of said discharge conduits, means whereby the filtrate from any one of said discharge conduits may be diverted from the common conduit and means for closing any one of said discharge conduits.

25. In a filter, a plurality of filter plates, spaced apart, a central support for said plate having a separate discharge conduit therein for each plate, a common conduit into which filtrate from all of said discharge conduits empties and means whereby the condition of the filtrate passing from any one of said discharge conduits to said common conduit may be examined separately.

FRANK K. ATKINS.
EARL F. ATKINS.

Witnesses:
 Asa M. Daniels,
 Margaret M. Green.